(12) United States Patent
Gallagher et al.

(10) Patent No.: US 12,233,724 B2
(45) Date of Patent: Feb. 25, 2025

(54) PROJECTION FOR VEHICLE FRAME RAIL

(71) Applicant: Ford Global Technologies, LLC, Dearborn, MI (US)

(72) Inventors: Stephen William Gallagher, Bloomfield Hills, MI (US); Vladimir Vladimirovich Bogachuk, West Bloomfield, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 252 days.

(21) Appl. No.: 17/731,358

(22) Filed: Apr. 28, 2022

(65) Prior Publication Data
US 2023/0347756 A1 Nov. 2, 2023

(51) Int. Cl.
*B60K 1/04* (2019.01)
*B60L 50/60* (2019.01)
*B60R 3/00* (2006.01)

(52) U.S. Cl.
CPC ............... *B60L 50/66* (2019.02); *B60K 1/04* (2013.01); *B60R 3/002* (2013.01); *B60K 2001/0405* (2013.01)

(58) Field of Classification Search
CPC ..... B60L 50/66; B60K 1/04; B60K 2001/0438; B60R 3/002
See application file for complete search history.

(56) References Cited

U.S. PATENT DOCUMENTS

| 1,678,657 | A | * | 7/1928 | Thomas | B60R 19/42 |
| | | | | | 280/163 |
| 4,266,792 | A | * | 5/1981 | Sanders | B60R 3/002 |
| | | | | | 296/199 |
| 9,187,131 | B2 | | 11/2015 | Young et al. | |
| 2021/0300476 | A1 | | 9/2021 | Gonzalez Mendivil et al. | |
| 2023/0030279 | A1 | * | 2/2023 | Barrios-Albert | B62D 25/2027 |

FOREIGN PATENT DOCUMENTS

| AU | 2012216535 B2 | 3/2013 |
| WO | 2021096333 A1 | 5/2021 |

* cited by examiner

*Primary Examiner* — Jason D Shanske
*Assistant Examiner* — James J Triggs
(74) *Attorney, Agent, or Firm* — Todd W. Dishman; Carlson, Gaskey & Olds, P.C.

(57) ABSTRACT

This disclosure relates to a projection for a vehicle frame rail and a corresponding method. In some aspects, the techniques described herein relate to a vehicle, including: a frame rail; and a projection extending laterally outward from a laterally outer surface of the frame rail, wherein the projection is a part of a running board assembly.

14 Claims, 5 Drawing Sheets

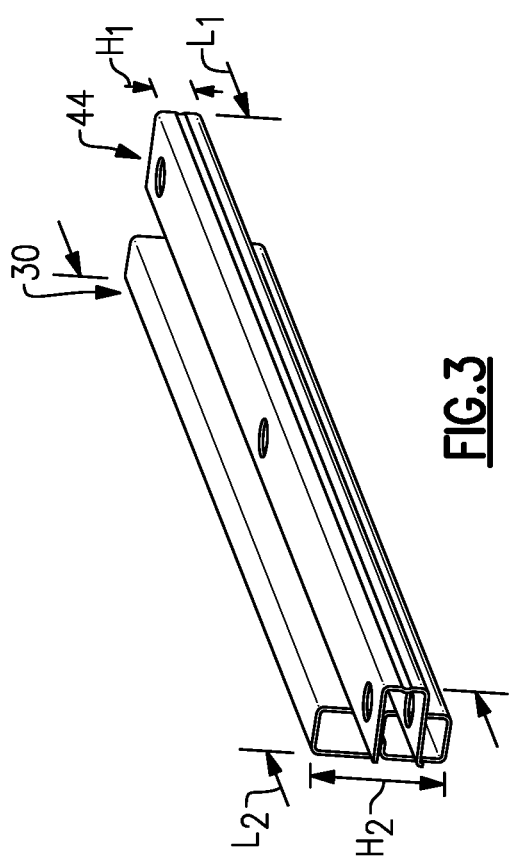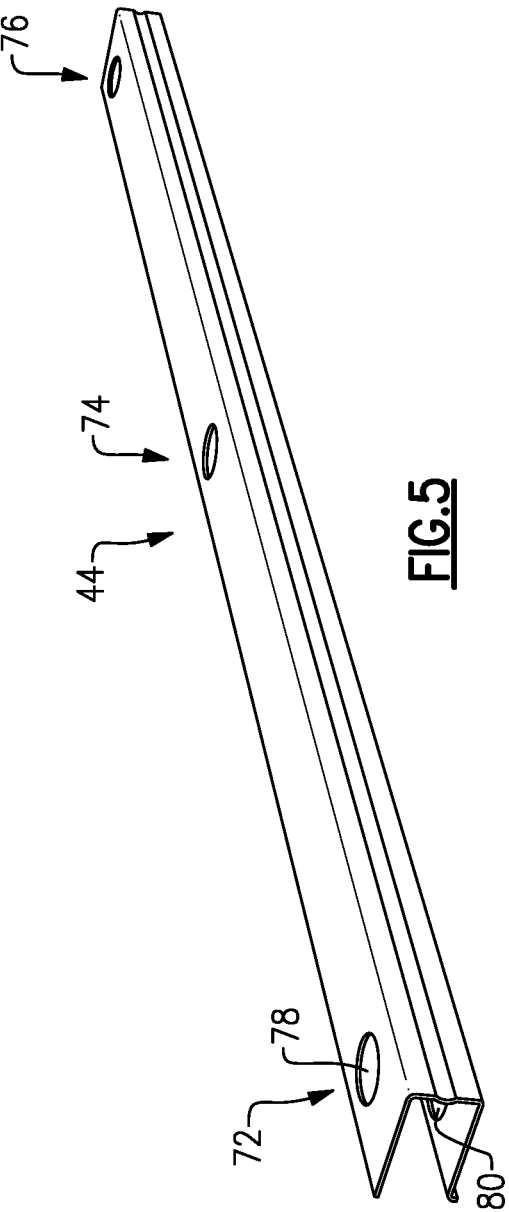

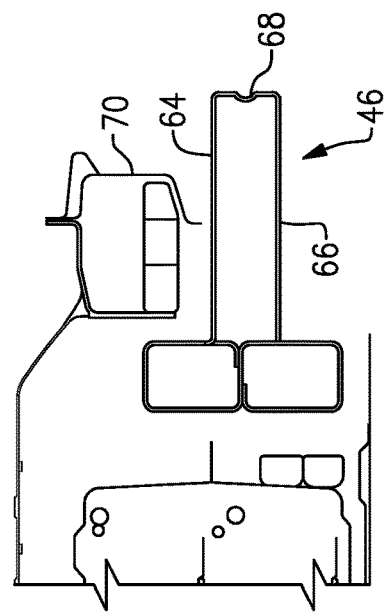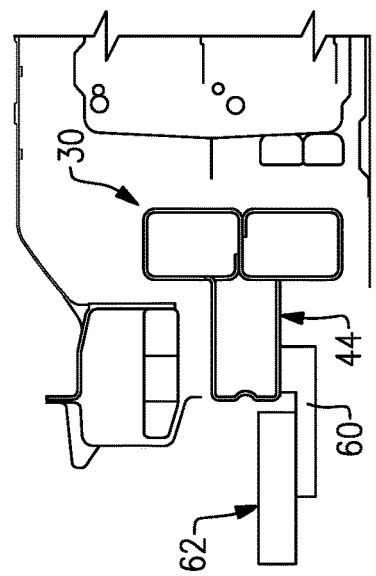
FIG.4

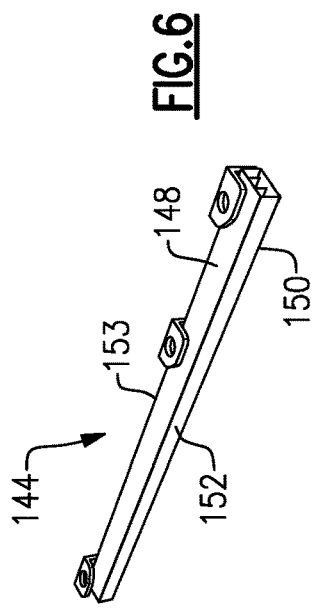
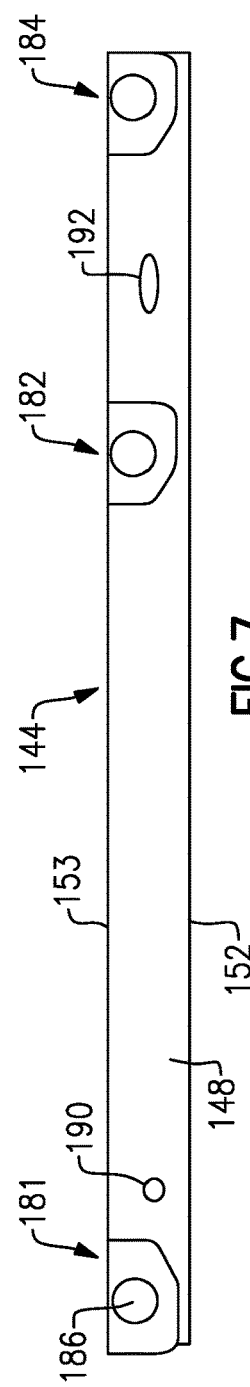
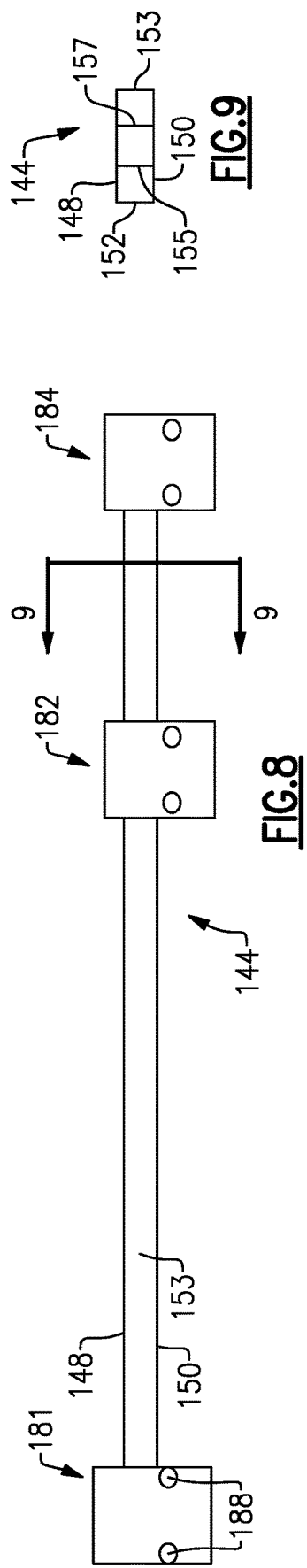

PROJECTION FOR VEHICLE FRAME RAIL

TECHNICAL FIELD

This disclosure relates to a projection for a vehicle frame rail and a corresponding method.

BACKGROUND

The desire to reduce automotive fuel consumption and emissions is well documented. Therefore, vehicles are being developed that reduce or completely eliminate reliance on internal combustion engines. Electrified vehicles are one type of vehicle currently being developed for this purpose. In general, electrified vehicles differ from conventional motor vehicles because they are selectively driven by one or more battery powered electric machines. Conventional motor vehicles, by contrast, rely exclusively on the internal combustion engine to drive the vehicle. Some electrified vehicles include a traction battery pack packaged at external, underbody locations of the vehicle.

SUMMARY

In some aspects, the techniques described herein relate to a vehicle, including: a frame rail; and a projection extending laterally outward from a laterally outer surface of the frame rail, wherein the projection is a part of a running board assembly.

In some aspects, the techniques described herein relate to a vehicle, wherein an upper surface of the projection provides a deck of a running board.

In some aspects, the techniques described herein relate to a vehicle, wherein a laterally outer surface of the projection extends laterally outward of a portion of a body of the vehicle.

In some aspects, the techniques described herein relate to a vehicle, wherein a deck of a running board is attached directly or indirectly to the projection.

In some aspects, the techniques described herein relate to a vehicle, wherein a height of the projection is less than a height of the frame rail.

In some aspects, the techniques described herein relate to a vehicle, further including a battery pack arranged on an opposite side of the frame rail as the projection.

In some aspects, the techniques described herein relate to a vehicle, further including: a plurality of body mounts configured to attach to one or more body panels of the vehicle, wherein the body mounts are spaced-apart from one another along a length of the projection.

In some aspects, the techniques described herein relate to a vehicle, wherein the body mounts are formed integrally with the projection.

In some aspects, the techniques described herein relate to a vehicle, wherein each of the body mounts includes: at least one opening configured to receive a fastener that attaches the projection to one or more body panels of the vehicle, and at least one opening configured to receive a fastener that attaches the projection to the frame rail.

In some aspects, the techniques described herein relate to a vehicle, wherein: the projection includes an upper wall, a lower wall, and a laterally outer wall extending vertically between the upper and lower wall, and the upper and lower walls are directly connected to the laterally outer surface of the frame rail.

In some aspects, the techniques described herein relate to a vehicle, wherein, when viewed in cross-section, an empty, enclosed space is bound by the laterally outer surface of the frame rail, the upper wall of the projection, the lower wall of the projection, and the laterally outer wall of the projection.

In some aspects, the techniques described herein relate to a vehicle, wherein: the projection includes an upper wall, a lower wall, a laterally outer wall extending vertically between the upper and lower wall, a laterally inner wall extending vertically between the upper and lower wall, and at least one vertical rib arranged laterally between the laterally inner and outer walls and extending vertically between the upper wall and the lower wall.

In some aspects, the techniques described herein relate to a vehicle, wherein: the projection includes a plurality of locator holes, and one of the locator holes is shaped differently than one of the other locator holes.

In some aspects, the techniques described herein relate to a vehicle, including: a frame rail; a projection extending laterally outward from a laterally outer surface of the frame rail; and a plurality of body mounts configured to attach to one or more body panels of the vehicle, wherein the body mounts are spaced-apart from one another along a length of the projection.

In some aspects, the techniques described herein relate to a vehicle wherein the body mounts are formed integrally with the projection.

In some aspects, the techniques described herein relate to a vehicle, wherein each of the body mounts includes: at least one opening configured to receive a fastener that attaches the body mount to one or more body panels of the vehicle, and at least one opening configured to receive a fastener that attaches the body mount to the frame rail.

In some aspects, the techniques described herein relate to a method, including: absorbing energy from a load applied to a projection extending laterally from a laterally outer surface of a frame rail of a vehicle.

In some aspects, the techniques described herein relate to a method, wherein the projection provides a portion of a running board assembly.

In some aspects, the techniques described herein relate to a method, wherein: the projection is connected to or integrally formed with a plurality of body mounts, the body mounts are configured to attach to one or more body panels of the vehicle, and the body mounts are spaced-apart from one another along a length of the projection.

In some aspects, the techniques described herein relate to a method, wherein: the body mounts are spaced-apart from one another at unequal distances, the projection includes locator holes, and at least one of the locator holes is a different shape than at least one of the other locator holes.

BRIEF DESCRIPTION OF THE DRAWINGS

FIG. 3 is a perspective view of a projection and a frame rail.

FIG. 4 is a view similar to FIG. 2 and illustrates two example running board assemblies.

FIG. 5 is a perspective view of a projection.

FIG. 6 is a perspective view of another projection.

FIG. 7 is a top view of the projection of FIG. 6.

FIG. 8 is a side view of the projection of FIG. 6.

FIG. 9 is a cross-sectional view of the projection of FIG. 6 taken along line 9-9 in FIG. 8.

DETAILED DESCRIPTION

This disclosure relates to a projection for a vehicle frame rail and a corresponding method. This disclosure has a number of benefits which will be appreciated from the following description. Among those benefits, this disclosure increases the ease of attaching and aligning body panels to a vehicle frame. Further, the projection of this disclosure is capable of absorbing energy from applied loads, and is also capable of providing a portion of a running board assembly.

Figure 1:
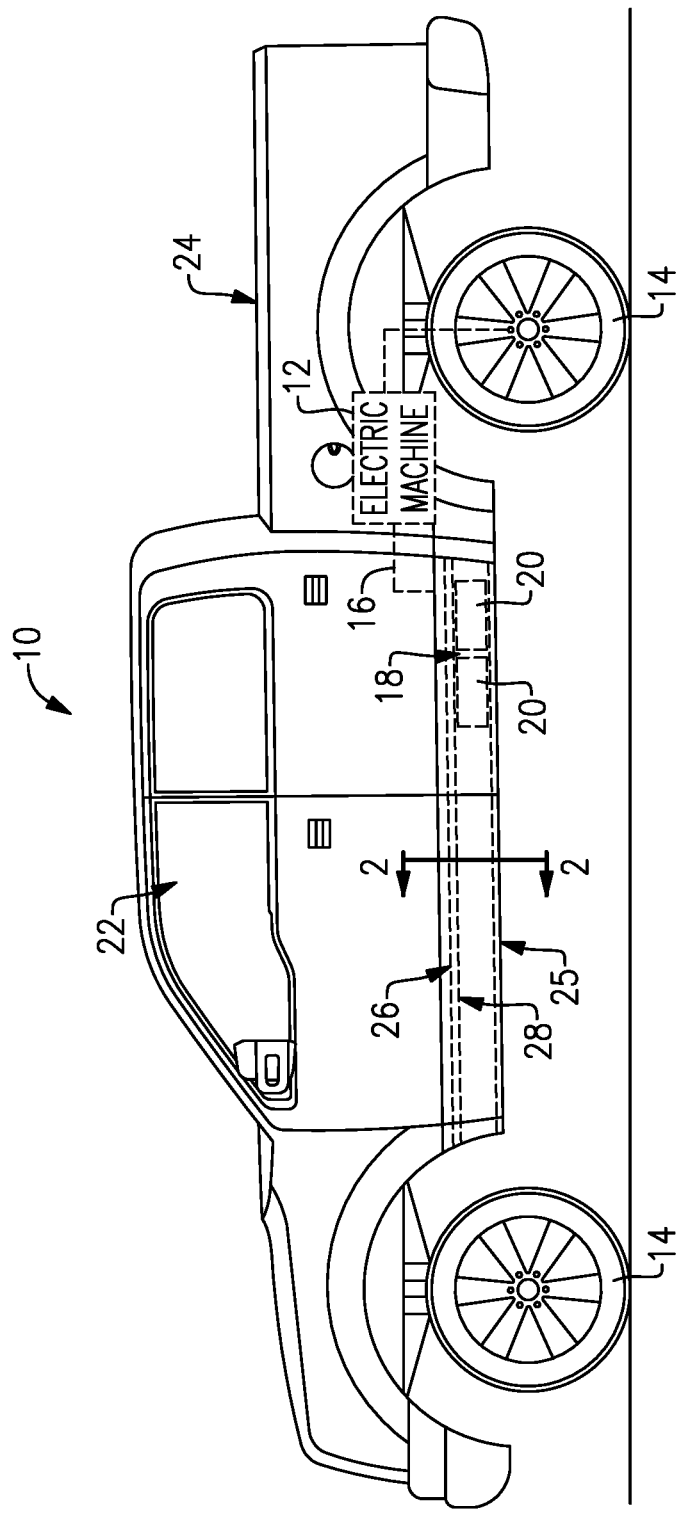
FIG. 1 schematically illustrates an electrified vehicle.

FIG. 1 schematically illustrates an electrified vehicle 10. The electrified vehicle 10 may include any type of electrified powertrain. In an embodiment, the electrified vehicle 10 is a battery electric vehicle (BEV). However, the concepts described herein are not limited to BEVs and could extend to other electrified vehicles, including, but not limited to, hybrid electric vehicles (HEVs), plug-in hybrid electric vehicles (PHEVs), fuel cell vehicles, etc. Therefore, although not specifically shown in this embodiment, the electrified vehicle 10 could be equipped with an internal combustion engine that can be employed either alone or in combination with other power sources to propel the electrified vehicle 10.

In an embodiment, the electrified vehicle 10 is a pickup truck. However, the electrified vehicle 10 could alternatively be a car, a van, a sport utility vehicle, or any other vehicle configuration. Although a specific component relationship is illustrated in the figures of this disclosure, the illustrations are not intended to limit this disclosure. The placement and orientation of the various components of the electrified vehicle 10 are shown schematically and could vary within the scope of this disclosure. In addition, the various figures accompanying this disclosure are not necessarily drawn to scale, and some features may be exaggerated or minimized to emphasize certain details of a particular component or system.

In the illustrated embodiment, the electrified vehicle 10 is a full electric vehicle propelled solely through electric power, such as by one or more electric machines 12, without any assistance from an internal combustion engine. The electric machine 12 may operate as an electric motor, an electric generator, or both. The electric machine 12 receives electrical power and provides a rotational output torque to one or more drive wheels 14.

A voltage bus 16 may electrically couple the electric machine 12 to a traction battery pack 18 ("battery pack 18"). The battery pack 18 is an exemplary electrified vehicle battery. The battery pack 18 may be a high voltage traction battery pack that includes a plurality of battery arrays 20 (i.e., battery assemblies or groupings of rechargeable battery cells) capable of outputting electrical power to power the electric machine 12 and/or other electrical loads of the electrified vehicle 10. Other types of energy storage devices and/or output devices could alternatively or additionally be used to electrically power the electrified vehicle 10.

The battery pack 18 may be mounted at various locations of the electrified vehicle 10. In an embodiment, the electrified vehicle 10 includes a passenger cabin 22 and a cargo space 24 (e.g., a truck bed) located to the rear of the passenger cabin 22. A floor pan 26 may separate the passenger cabin 22 from a vehicle frame 28, which generally establishes an underbody 25 of the electrified vehicle 10. The battery pack 18 may be suspended from or otherwise mounted relative to the vehicle frame 28 such that it is remote from both the passenger cabin 22 and the cargo space 24. The battery pack 18 therefore does not occupy space that would otherwise be available for carrying passengers or cargo.

Figure 2:
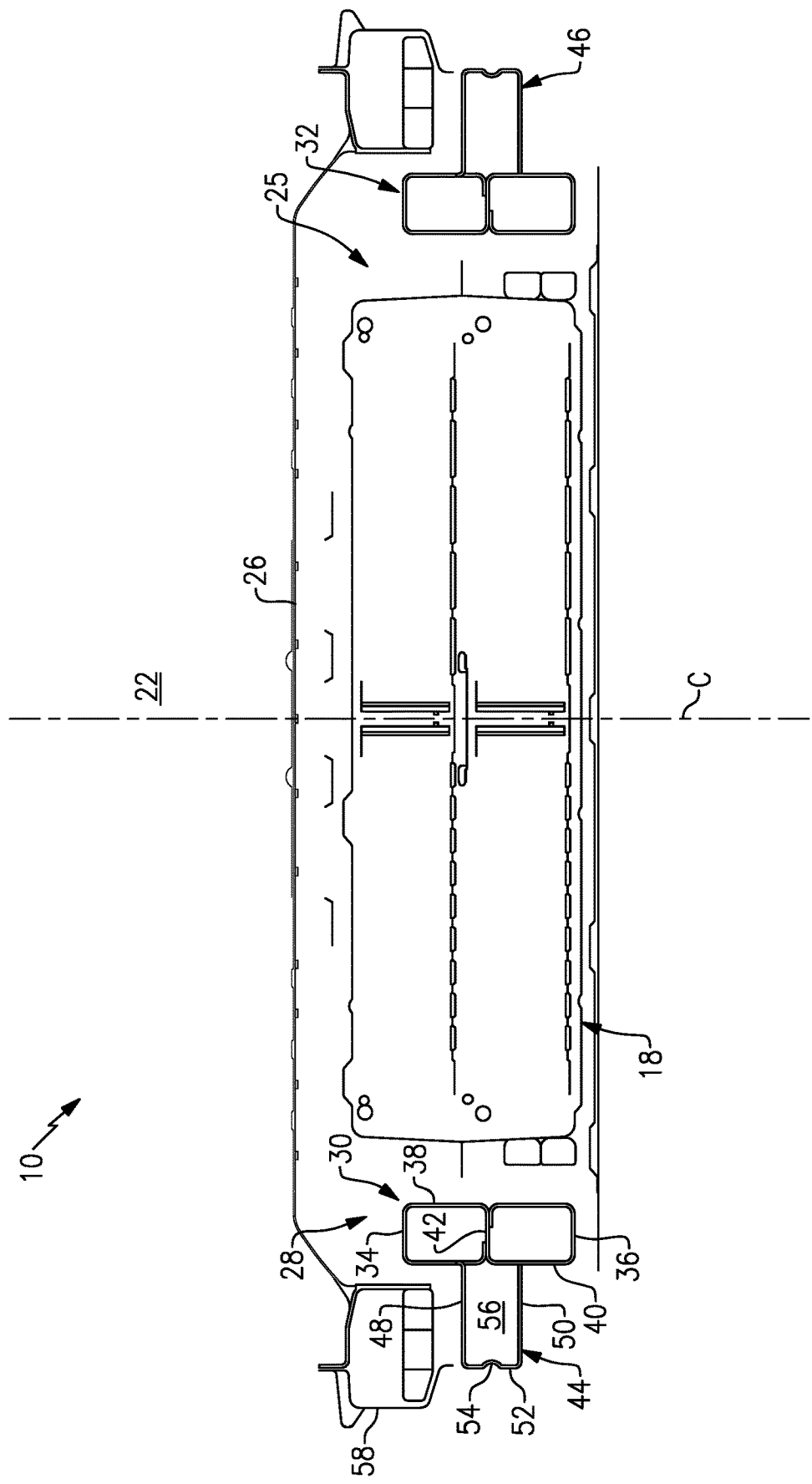
FIG. 2 is a cross-sectional view of a portion of the vehicle taken along line 2-2 in FIG. 1.

Referring now to FIG. 2, which is a cross-sectional view taken through line 2-2 in FIG. 1, additional detail of the arrangement of the battery back 18 relative to the vehicle frame 28 is shown. In this disclosure, the vehicle frame 28 includes first and second front frame rails 30, 32. The first and second front frame rails 30, 32 are made of enclosed, hollow structures, which may be formed using an extrusion process. This disclosure is not limited to extruded or hollow rails, and extends to rails formed using other manufacturing techniques and with different cross-sectional profiles.

The first frame rail 30 is arranged on a driver side (in geographic regions such as North America) of the vehicle 10 and the second frame rail 32 is arranged on an opposite side of the centerline C of the vehicle 10, namely on the passenger side of the vehicle 10. The first and second frame rails 30, 32 are substantially identical to one another, mirrored about the centerline C. The battery pack 18 is arranged laterally (in the side-to-side direction, relative to FIG. 2) between the first and second frame rails. The centerline C extends longitudinally along the enter length of the vehicle 10, generally in-and-out of the page in FIG. 2. The first and second frame rails 30, 32 each also extend generally longitudinally along a length of the vehicle 10.

With reference to the first frame rail 30, the first frame rail 30 includes an upper wall 34, a lower wall 36, a laterally inner surface 38 facing the centerline C and the battery pack 18, and a laterally outer surface 40 on an opposite side of the laterally inner surface 38, facing away from the centerline C and the battery pack 18. The first frame rail 30 is an enclosed, hollow structure in this example. Further, in this example, the first frame rail 30 includes an internal divider 42 extending between the laterally inner and outer surfaces 38, 40 and arranged vertically between the upper and lower walls 34, 36. The internal divider 42 is not required in all examples. The first frame rail 30 may be formed by an extrusion process or by bending or roll forming a piece of metal into shape, as examples. Again, the second frame rail 32 is arranged in substantially the same manner as the first frame rail 30.

The vehicle 10 further includes first and second projections 44, 46 projecting laterally outward from the first and second frame rails 30, 32, respectively. The first and second projections 44, 46 are arranged substantially similarly, but mirrored about the centerline C. With reference to first projection 44, the first projection 44 includes an upper wall 48, a lower wall 50, and a laterally outer wall 52 extending vertically between the upper and lower walls 48, 50. The laterally outer wall 52 includes a curve 54 along its height in this example to relieve stresses in the first projection 44. The upper and lower walls 48, 50 are directly connected to the laterally outer surface 40 of the first frame rail 30 by welding, for example.

An interior 56 of the first projection 44 is substantially hollow. Specifically, in this example, the interior 56 is an empty, enclosed space bound by the laterally outer surface 40 of the first frame rail 30, the upper wall 48, the lower wall 50, and the laterally outer wall 52. The first projection 44 may be formed by a roll forming process, in an example.

With reference to FIG. 3, the first projection 44 exhibits a length $L_1$, which is at least as long as, or longer than, a length $L_2$ of the first frame rail 30. Further, the first projection 44 exhibits a height $H_1$ which is less than the height $H_2$ of the first frame rail 30. The height $H_1$ is about one half the height $H_2$ in one example.

The arrangement of the first projection 44 makes the first projection 44 particularly suitable for absorbing applied loads, such as loads applied to a side of the vehicle 10.

In an aspect of this disclosure, the first and second projections 44, 46 can provide a portion of a running board assembly. In particular, as shown in FIG. 2, the first projection 44 is arranged such that the laterally outer wall 52 is laterally aligned with and arranged vertically beneath a rocker panel 58 of the vehicle 10. In that example, the first projection 44 can provide a support configured to attach one or more links 60 to a running board deck 62 and the first frame rail 30, as shown in FIG. 4. The running board deck 62 projects laterally outward of the rocker panel 58, in this example. The running board deck 62 could be attached directly to the first projection 44 without the links 60, in another example. The second projection 46 could be arranged similarly to provide a running board assembly on an opposite side of the vehicle 10.

Alternatively, the first and second projections 44, 46 could be arranged to provide a running board deck themselves. In FIG. 4, the second projection 46 is shown as having elongated upper and lower walls 64, 66, which are sized such that a laterally outer wall 68 projects laterally outward of an adjacent rocker panel 70. As such, a portion of the upper wall 64 may provide a running board deck. The upper wall 64 can include channels, ribs, or other features to increase traction between a user's foot and the upper wall 64. The first projection 44 may be arranged similar to the manner in which the second projection 46 is arranged in FIG. 4.

Another aspect of the first projection 44 includes body mounts. With reference to FIG. 5, the first projection 44 includes a plurality of body mounts 72, 74, 76 spaced apart from one another along the length of the first projection 44. Each of the body mounts 72, 74, 76 includes a first opening 78 in the upper wall 48 and a second opening 80 in the lower wall 50 aligned with the corresponding first opening 78. Only one set of openings is shown. The body mounts 72, 74, 76 are sized and shaped to receive fasteners for the attachment of one or more body panels to the first projection 44. The body mounts 72, 74, 76 include differently-sized or shaped openings, in one example. Alternatively or additionally, the body mounts 72, 74, 76 may be spaced-apart from one another by unequal distances along the length of the first projection 44. Variations in the sizing, shaping, and/or spacing of the body mounts 72, 74, 76 may facilitate a correct alignment of body panels relative to the first projection 44, as the body panels may include lugs that fit only into certain of the body mounts 72, 74, 76, thereby increasing the ease of assembling the body panels relative to the first projection 44.

FIGS. 6-9 illustrate another embodiment of the first projection 144. In FIGS. 6-9, the first projection 144 corresponds substantially to the first projection 44, with like parts having like reference numerals preappended with a "1."

With joint reference to FIGS. 6-9, the first projection 144 includes an upper wall 148, a lower wall 150, a laterally outer wall 152, and a laterally inner wall 153. As shown in FIG. 9, the first projection 144 includes first and second ribs 155, 157 extending vertically between the upper and lower walls 148, 150 and arranged laterally between the laterally outer and inner walls 152, 153. The first projection 144 is formed by an extrusion process, in this example. The laterally inner wall 153 is directly abutted against the laterally outer surface 40 of the first frame rail 30. Alternatively, the first projection 144 could be integrally formed with the first frame rail 30 in a single extrusion process.

The first projection 144 includes a plurality of mounts 181, 182, 184 spaced-apart from one another along a length of the first projection 144. The mounts 181, 182, 184 are unequally spaced-apart from one another. With reference to the mount 181, which is representative of the arrangement of mounts 182, 184, the mount 181 includes an opening 186 configured to receive a fastener that attaches the first projection 144 to one or more body panels of the vehicle 10, and another set of openings 188 configured to receive a fastener that attaches the body mount 181 to the first projection 144. The set of openings 188 is only necessary when the first projection 144 is not integrally formed with the first frame rail 30.

The mounts 181, 182, 184 exhibit a height greater than the first projection 144 in this example, and in particular extend above and below the upper and lower walls 148, 150, respectively. The mounts 181, 182, 184 may be formed integrally with the first projection 144 or formed separately and attached to the first projection.

As an added alignment feature, the first projection 144 may include a plurality of locator holes 190, 192. The locator holes 190, 192 extend through the entire height of the first projection 144, and in this example exhibit different sizes and shapes. The locator holes 190, 192 are sized and shaped to correspond to the size and shape of lugs projecting from one or more body panels. As such, the locator holes 190, 192 facilitate a correct attachment of the body panels to the first projection 144, thereby increasing the ease of assembling the body panels relative to the first projection 144.

Directional terms such as "upper," "lower," "lateral," "inward," "outward," etc., are used herein for purposes of explanation of the orientation of the various components, as those components are depicted in the drawings. These terms should not otherwise be deemed limited. It should be understood that terms such as "generally," "substantially," and "about" are not intended to be boundaryless terms, and should be interpreted consistent with the way one skilled in the art would interpret those terms.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A vehicle, comprising: a frame rail; and a projection extending laterally outward from a laterally outer surface of the frame rail, wherein the projection is a part of a running board assembly; a plurality of body mounts configured to attach to one or more body panels of the vehicle, wherein the body mounts are spaced-apart from one another along a length of the projection; and wherein each of the body mounts includes:

at least one opening configured to receive a fastener that attaches the projection to one or more body panels of the vehicle, and at least one opening configured to receive a fastener that attaches the projection to the frame rail.

2. The vehicle as recited in claim 1, wherein an upper surface of the projection provides a deck of a running board.

3. The vehicle as recited in claim 2, wherein a laterally outer surface of the projection extends laterally outward of a portion of a body of the vehicle.

4. The vehicle as recited in claim 1, wherein a deck of a running board is attached directly or indirectly to the projection.

5. The vehicle as recited in claim 1, wherein a height of the projection is less than a height of the frame rail.

6. The vehicle as recited in claim 1, further comprising a battery pack arranged on an opposite side of the frame rail as the projection.

7. The vehicle as recited in claim 1, wherein the body mounts are formed integrally with the projection.

8. The vehicle as recited in claim 1, wherein:
the projection includes an upper wall, a lower wall, and a laterally outer wall extending vertically between the upper and lower wall, and
the upper and lower walls are directly connected to the laterally outer surface of the frame rail.

9. The vehicle as recited in claim 8, wherein, when viewed in cross-section, an empty, enclosed space is bound by the laterally outer surface of the frame rail, the upper wall of the projection, the lower wall of the projection, and the laterally outer wall of the projection.

10. The vehicle as recited in claim 1, wherein:
the projection includes an upper wall, a lower wall, a laterally outer wall extending vertically between the upper and lower wall, a laterally inner wall extending vertically between the upper and lower wall, and at least one vertical rib arranged laterally between the laterally inner and outer walls and extending vertically between the upper wall and the lower wall.

11. The vehicle as recited in claim 10, wherein:
the projection includes a plurality of locator holes, and
one of the locator holes is shaped differently than one of the other locator holes.

12. A vehicle, comprising:
a frame rail;
a projection extending laterally outward from a laterally outer surface of the frame rail; and
a plurality of body mounts configured to attach to one or more body panels of the vehicle, wherein the body mounts are spaced-apart from one another along a length of the projection,
wherein the projection includes an upper wall, a lower wall, and a laterally outer wall extending vertically between the upper and lower wall,
wherein the upper and lower walls are directly connected to the laterally outer surface of the frame rail, and
wherein, when viewed in cross-section, an empty, enclosed space is bound by the laterally outer surface of the frame rail, the upper wall of the projection, the lower wall of the projection, and the laterally outer wall of the projection.

13. The vehicle as recited in claim 12 wherein the body mounts are formed integrally with the projection.

14. The vehicle as recited in claim 12, wherein each of the body mounts includes:
at least one opening configured to receive a fastener that attaches the body mount to one or more body panels of the vehicle, and
at least one opening configured to receive a fastener that attaches the body mount to the frame rail.

* * * * *